Figure 1:
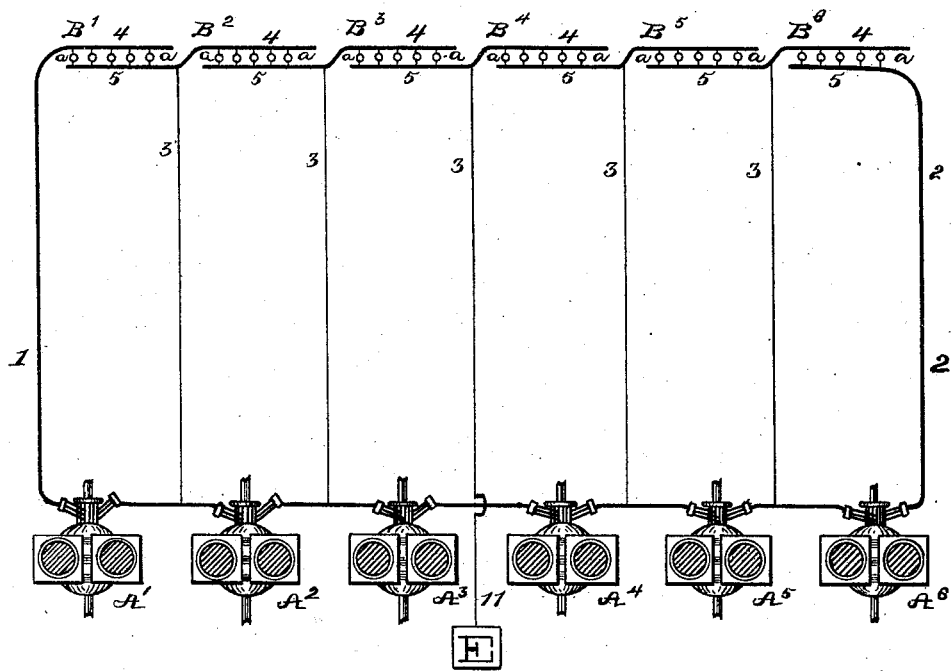

(No Model.)  2 Sheets—Sheet 1.

T. A. EDISON.
SYSTEM OF ELECTRICAL DISTRIBUTION.

No. 304,085.  Patented Aug. 26, 1884.

ATTEST:  INVENTOR:
E. C. Rowland  Thomas A. Edison,
H. W. Seely  By Rich'd N. Dyer
 Atty.

(No Model.)  2 Sheets—Sheet 2.

T. A. EDISON.
SYSTEM OF ELECTRICAL DISTRIBUTION.

No. 304,085.  Patented Aug. 26, 1884.

ATTEST:  INVENTOR:

UNITED STATES PATENT OFFICE.

THOMAS A. EDISON, OF MENLO PARK, NEW JERSEY.

SYSTEM OF ELECTRICAL DISTRIBUTION.

SPECIFICATION forming part of Letters Patent No. 304,085, dated August 26, 1884.

Application filed December 12, 1883. (No model.)

*To all whom it may concern:*

Be it known that I, THOMAS A. EDISON, of Menlo Park, in the county of Middlesex and State of New Jersey, have invented a new and useful Improvement in Systems of Electrical Distribution, (Case No. 591,) of which the following is a specification.

My invention relates to compensating systems of electrical distribution, such as the one described in my Patent No. 274,290; and the principal object I have in view is such an arrangement of the conductors and translating devices that all the translating devices will be equidistant from the source of electrical energy, and hence will be affected alike without the necessity of running feeding-circuits to various parts of the system, in order to equalize the electro-motive force at the translating devices. This I accomplish in the following manner: The conductors and translating devices of each division of the compound compensating-circuit are arranged so that for each translating device a greater length of conductor on one side of the circuit will be opposed by a correspondingly shorter length on the other side of the circuit. This feature of arrangement is carried out in the connection of the several divisions of the compound compensating-circuit, the connected conductors extending in opposite directions and forming opposite sides of the divisions connected— that is to say, the negative side of one division of the circuit is connected to the positive side of the next division, and so on. The main conductors from the source of electrical energy at the central station are connected to opposite sides of the first and last divisions of the circuit, while the compensating-conductors are run out from points between the sections of the source of energy to the conductors connecting the divisions of the circuit. By this arrangement only one set of mains and compensating-conductors is required, while the translating devices are all equidistant from the source of electrical energy. This relation is always preserved and is not affected by differences in the number of translating devices in the several divisions of the circuit, or by the total stoppage or neutralization of the current in one or more divisions, since the translating devices are equidistant from the source of electrical energy by way of the compensating-conductors as well as by way of the main conductors. In practice the district to be lighted from one source of electrical energy will be divided into as many parts as there are divisions of the compound compensating-circuit. Each division of the district may be one or more blocks of a town or city, or, if the plant is a small one, one or more buildings, or one or more floors or other parts of the building, or other object or place to be lighted. Throughout each division will be run a pair of main conductors, one being the positive and the other the negative main conductor, with relation to the translating devices of the particular division. If the district is composed of the blocks of a town or city, the pairs of main conductors of each division will be run around the blocks or through them, or both. Each conductor will be made preferably endless, and the positive conductors of the division will be connected together, and likewise the negative conductors, so far as it is practicable, in order to reduce the resistance and to make the conductors of each division to overlap throughout their length. The lamps or other translating devices will be arranged in multiple arc in circuits derived from this pair of main conductors, circuits being run, in the case of town or city blocks, from the main conductors in the streets into the houses. Each division of the circuit, it will be seen, is composed of a pair of main conductors, the conductors of like kind being all connected together, and the lamps are arranged in multiple arc in circuits derived from these main conductors. At the central station the source of electrical energy is composed, preferably, of dynamo or magneto electric machines in series or multiple series, there being one or more machines for each division of the circuit. The main conductors from the positive side of the source of electrical energy or "battery" of generators extend to the positive main conductor of the first division of the circuit. Then, by electrical test or mathematical computation, the opposite extremity of the other side of that division of the circuit is determined, and a conductor is connected to it, and runs to the positive side of the next division. In this way the two or more divisions of the circuit are connected together, and the negative side of the last division is connected with the negative side of the source of electrical energy. The compensating-conductors extend from points between the sections of the battery of generators to the conductors connecting the two or more divisions of the compound compensating-circuit. By this arrangement but one set of main and compensating conductors running from the central station is required, and, except where such conductors from the station are run, the circuit will be composed of two conductors instead of three, as in the arrangements heretofore of my compensating system. It is not essential that the district lighted or the division thereof should be symmetrical. In practice I propose to have the first and last divisions of the circuit close to or adjoining the central station, while the other divisions will be at a greater distance therefrom. In this way a saving will be effected in the main conductors leading from the central station.

A further object of my invention is to prevent to a large extent the bad effects of leaks to ground on a compensating system wherein a high electro-motive force is employed. To accomplish this I divide or diminish by half the electro-motive force of the leaks, and this I do by making a connection with earth at the center of the system. This connection may be made at the central station. The difference in potential between this central permanent ground and an accidental ground on either of the main conductors, it will be understood, is only one-half the entire electromotive force of the generators; and a leak on a compensating-conductor (where more than one compensating-conductor is used) would have a current of proportionately less tension than the tension of the main current. By having this permanent ground at the center of the system a leak on either side of the system will appear and can be located and repaired before a corresponding leak on the other side occurs. Hence the leaks will always have currents of lower tension than if no central permanent ground were employed.

Figure 2:
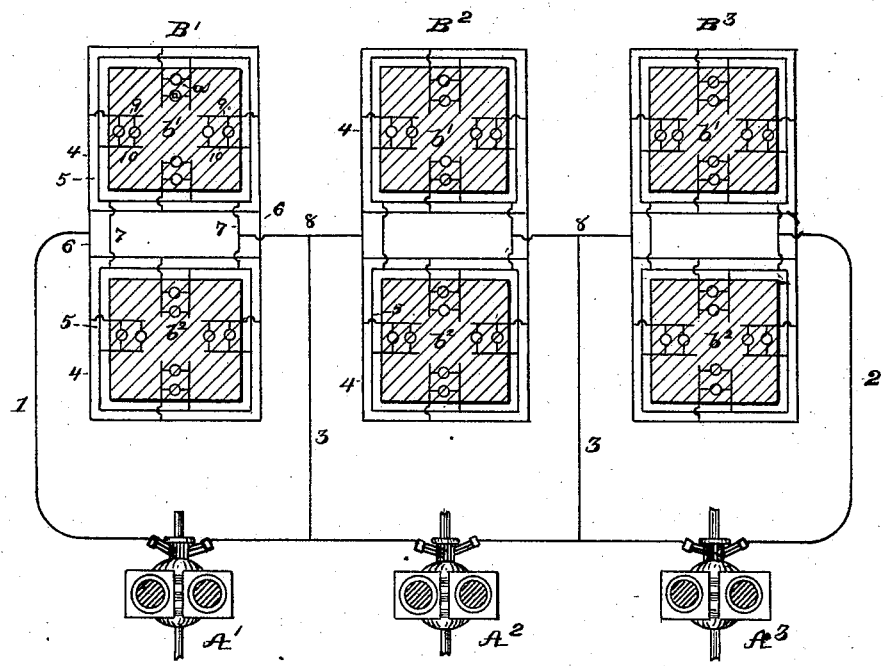

In the accompanying drawings, forming a part hereof, Figure 1 is a diagrammatic illustration of an arrangement embodying my present invention, and Fig. 2 a similar view of the same principle applied to a district composed of city or town blocks.

With reference more especially to Fig. 1, A' A², &c., represent dynamo or magneto electric machines, of which there are as many connected together in series as there are divisions of the compound compensating-circuits. Six of such machines are shown in the drawings. From opposite poles of this battery of generators run the positive and negative main conductors 1 2, while from points between the machines extend the compensating-conductors 3.

B' B², &c., represent the divisions of the compound compensating-circuit, each composed of lapping main conductors 4 5, in circuits derived from which are the lamps or other translating devices, a. The positive conductor 4 of B' is connected with the positive conductor 1 from the central station. The negative conductor 5 of B' is connected with the positive conductor 4 of B², and so on, the negative conductor 5 of the last division B⁶ being connected with the negative conductor 2 from the central station. The compensating-conductors 3 are connected with the main conductors at points between the divisions of the circuit. The conductors 4 5 are lapping-conductors—that is, the extreme end of 5 is located opposite the beginning of 4, and where 4 ends there 5 begins. By this arrangement all the translating devices are made equidistant from the source of electrical energy both by way of the main conductors and the compensating-conductors.

With reference more especially to Fig. 2, this figure represents the same principle applied to the lighting of a district in a city or town. A three-part system is shown, there being three dynamo or magneto electric machines, A', A², and A³, and main and compensating conductors 1 2 3, leading therefrom. These machines will be located together at a central station. The district to be lighted (represented by six blocks) is divided into three divisions, B' B² B³, each division being composed of two blocks, b' b². A positive conductor, 4, is run entirely around each block, completely encircling the same, the ends of the conductor being joined to make an endless conductor. A negative conductor, 5, is run in a like manner around each block. For each division the conductors of like kind of the two or more blocks composing the division are connected together by conductors 6 7. Connections 6 7 are made between the conductors of blocks b' b², at opposite extremes of each division of the circuit. Intermediate connections may also be made. Positive main conductor 1 is connected with the nearest central cross-connection, 6, of the positive main conductor 4 of division B'. From the most distant central cross-connection, 7, of the negative conductors 5 of division B' runs a conductor, 8, to the nearest positive central cross-connection, 6, of B². Divisions B² and B³ are connected in a like manner by another conductor, 8, while with the negative side of B³ is connected the negative main conductor 2 from the central station. The compensating-conductors 3 run to the division-connecting conductors 8. House-circuits 9 10 extend from the main conductors 4 5, and in them are arranged in multiple arc the lamps or other translating devices a. These translating devices are all equidistant from the source of electrical energy, the arrangement of endless conductors and central connections producing a true lapping of the conductors, the same as described in connection with Fig. 1.

Referring again to Fig. 1, to divide the electromotive force of the leaks to ground a ground-connection is made by conductor 11 at the center of the system.

What I claim is—

1. In a compensating system of electrical distribution, the combination, with the divided source of electrical energy, and the main conductors and compensating conductor or conductors leading therefrom, of translating devices arranged in multiple arc in each division of the compound compensating-circuit equidistant from the source of electrical energy, substantially as set forth.

2. In a compensating system of electrical distribution, the combination, with the divided source of electrical energy, and the main conductors and compensating conductor or conductors leading therefrom, of main conductors for each division of the compound compensating-circuit arranged to overlap each other, as described, and translating devices located in circuits from such main conductors equidistant from the source of electrical energy, substantially as set forth.

3. In a compensating system of electrical distribution, the combination of the main and compensating conductors, of a pair of main conductors for each division of the circuit, and translating devices located in circuits from such main conductors, substantially as set forth.

4. In a compensating system of electrical distribution, wherein a district is divided into as many sections as there are divisions of the compound compensating-circuit, the combination of a pair of main conductors for each section, translating devices in circuit from such pair of main conductors, connecting-conductors between the conductors of the sections, the positive and negative conductors from the central station connected with the first and last sections, and one or more compensating-conductors running from the divided source of electrical energy to the connection or connections between the sections, substantially as set forth.

5. In a compensating system of electrical distribution, wherein a district is divided into as many sections as there are divisions of the compound compensating-circuit, the combination, with the divided source of electrical energy, of one set of main and compensating conductors, a pair of main conductors for each section of the district, translating devices located in circuit from such pair of main conductors, connections between the conductors of the sections, and with the conductors from the central station, the conductors being arranged to overlap, whereby the translating devices are all equidistant from the source of electrical energy, substantially as set forth.

6. In a compensating system of electrical distribution, the combination, with the divided source of electrical energy, and the main conductors, and compensating conductor or conductors running therefrom, of the pairs of endless conductors for each division of the circuit, translating devices located in circuits from each pair of endless conductors, central connections between the positive and negative conductors of the two or more pairs, central connections between opposite conductors of the first and last pairs, and the main conductors from the central station, and a connection or connections between the compensating conductor or conductors and the conductor or conductors connecting the pairs together, substantially as set forth.

7. In a compensating system of electrical distribution, such as described, a central ground-connection for dividing the electro-motive force of leaks to ground, substantially as set forth.

This specification signed and witnessed this 15th day of November, 1883.

THOS. A. EDISON.

Witnesses:
H. W. SEELY,
EDWARD H. PYATT.